Jan. 4, 1955  J. E. CROWELL  2,698,561
CAMERA WITH REFLECTIVE FILM BACKING PLATE
Filed Feb. 1, 1952  4 Sheets-Sheet 1
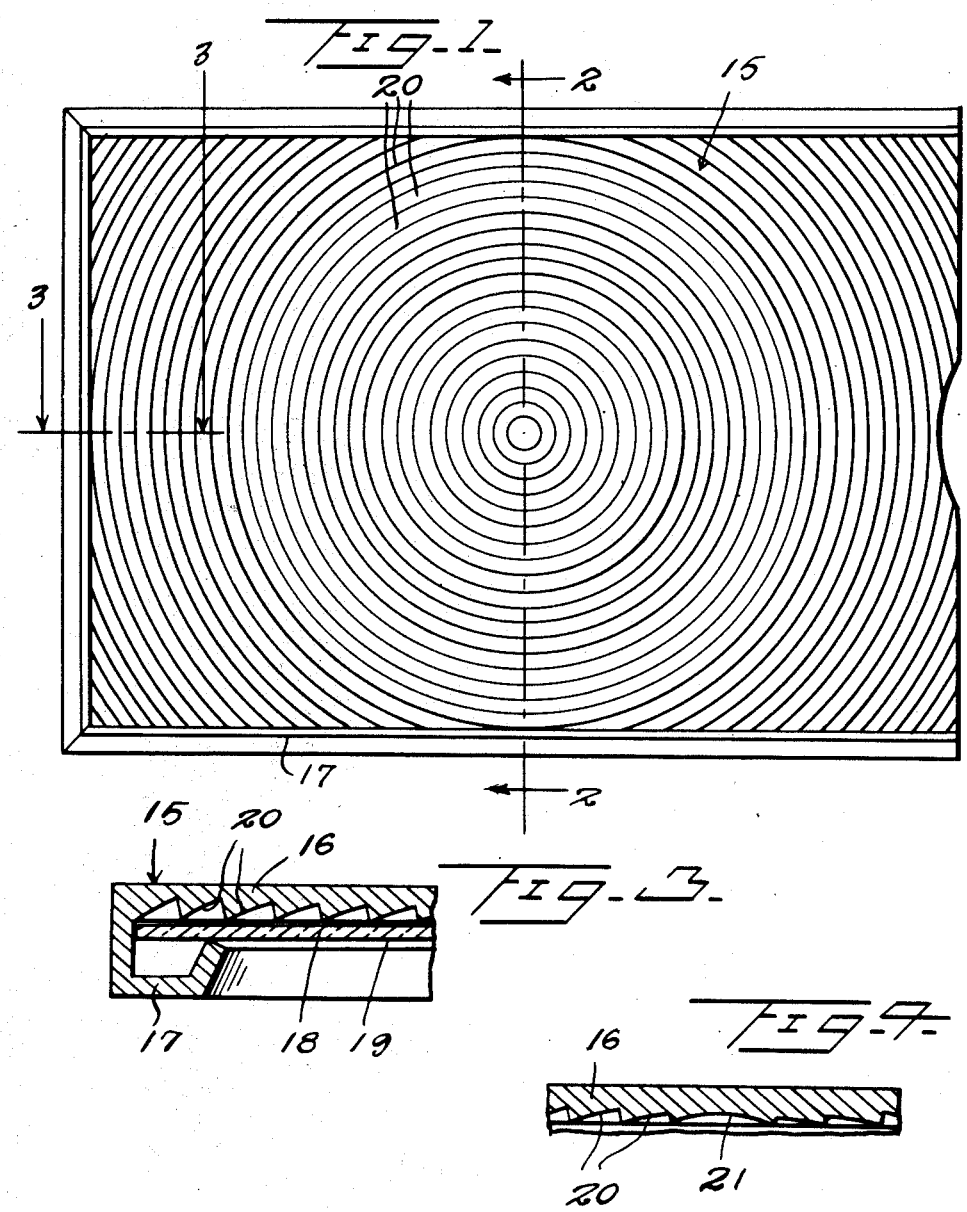
INVENTOR
John E. Crowell
BY Kimmel & Crowell
ATTORNEYS

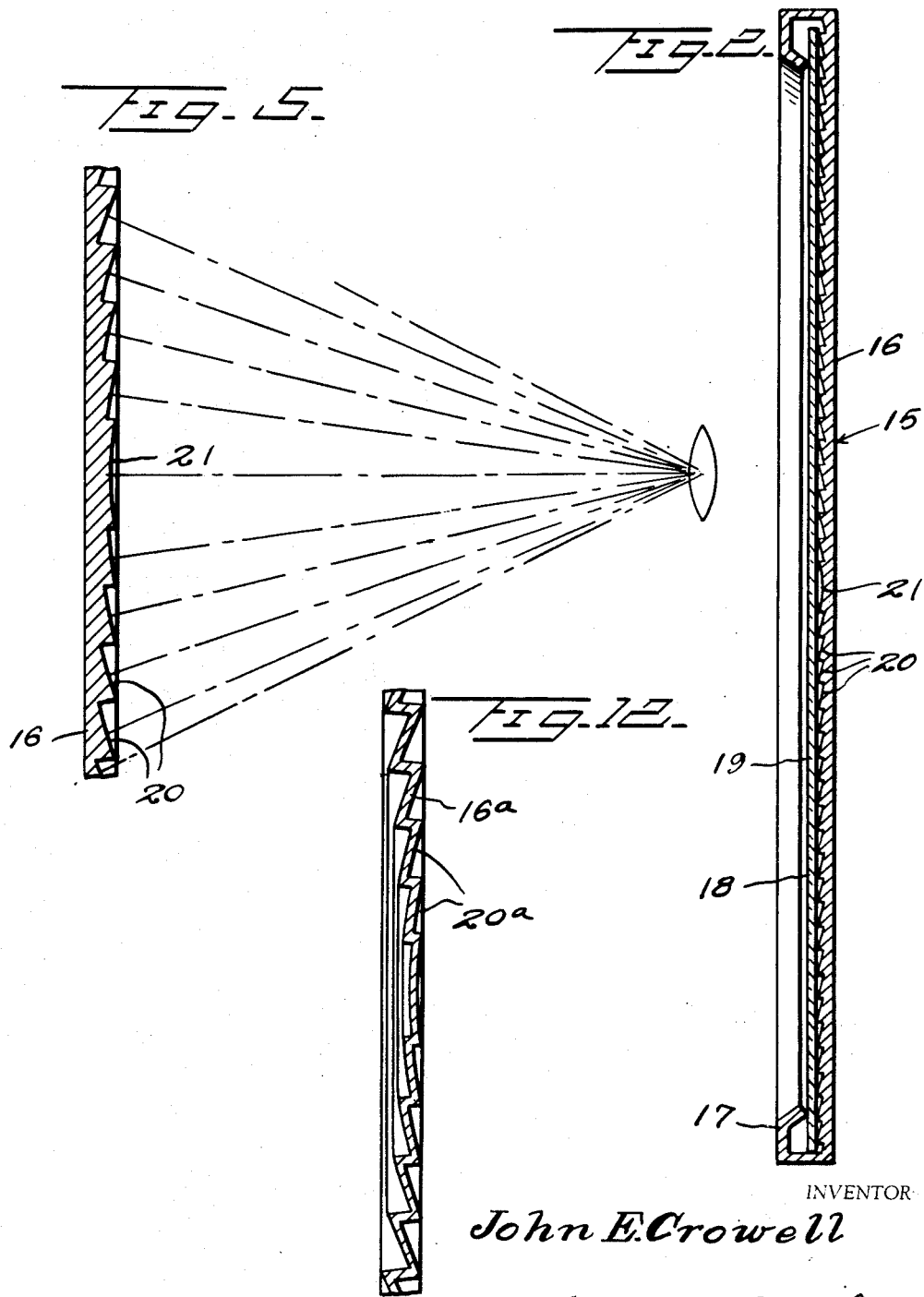

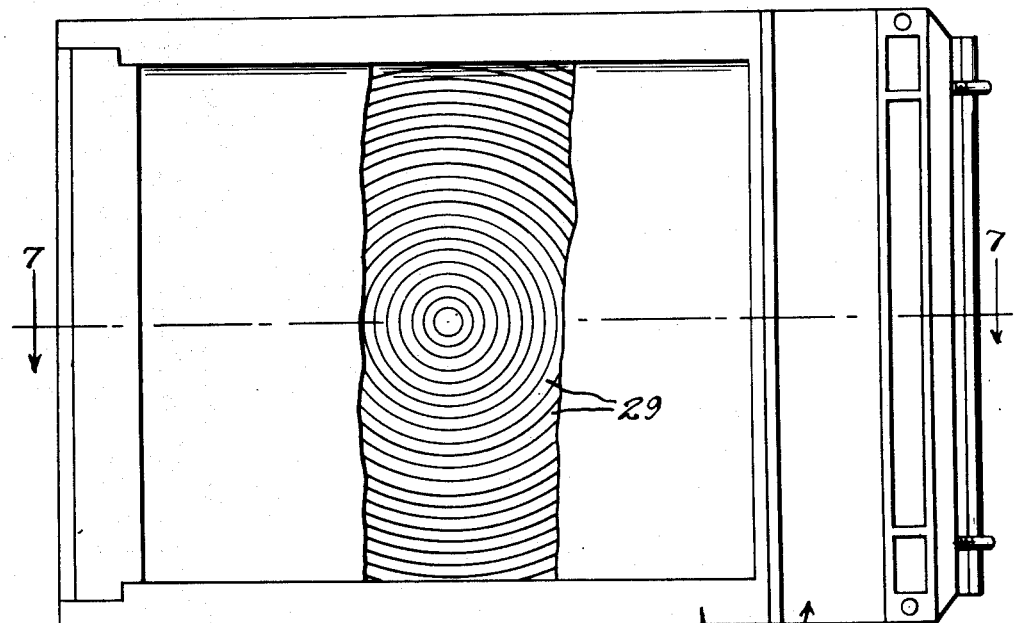
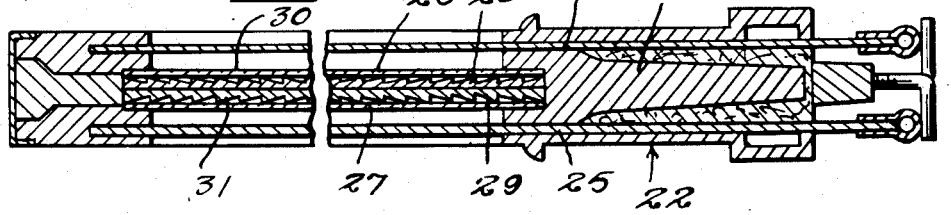
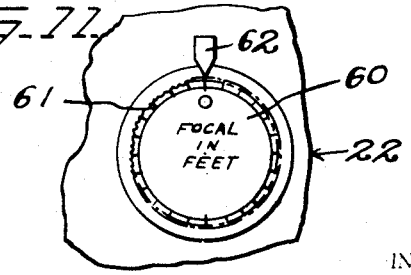
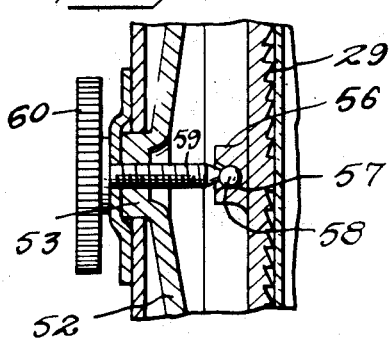

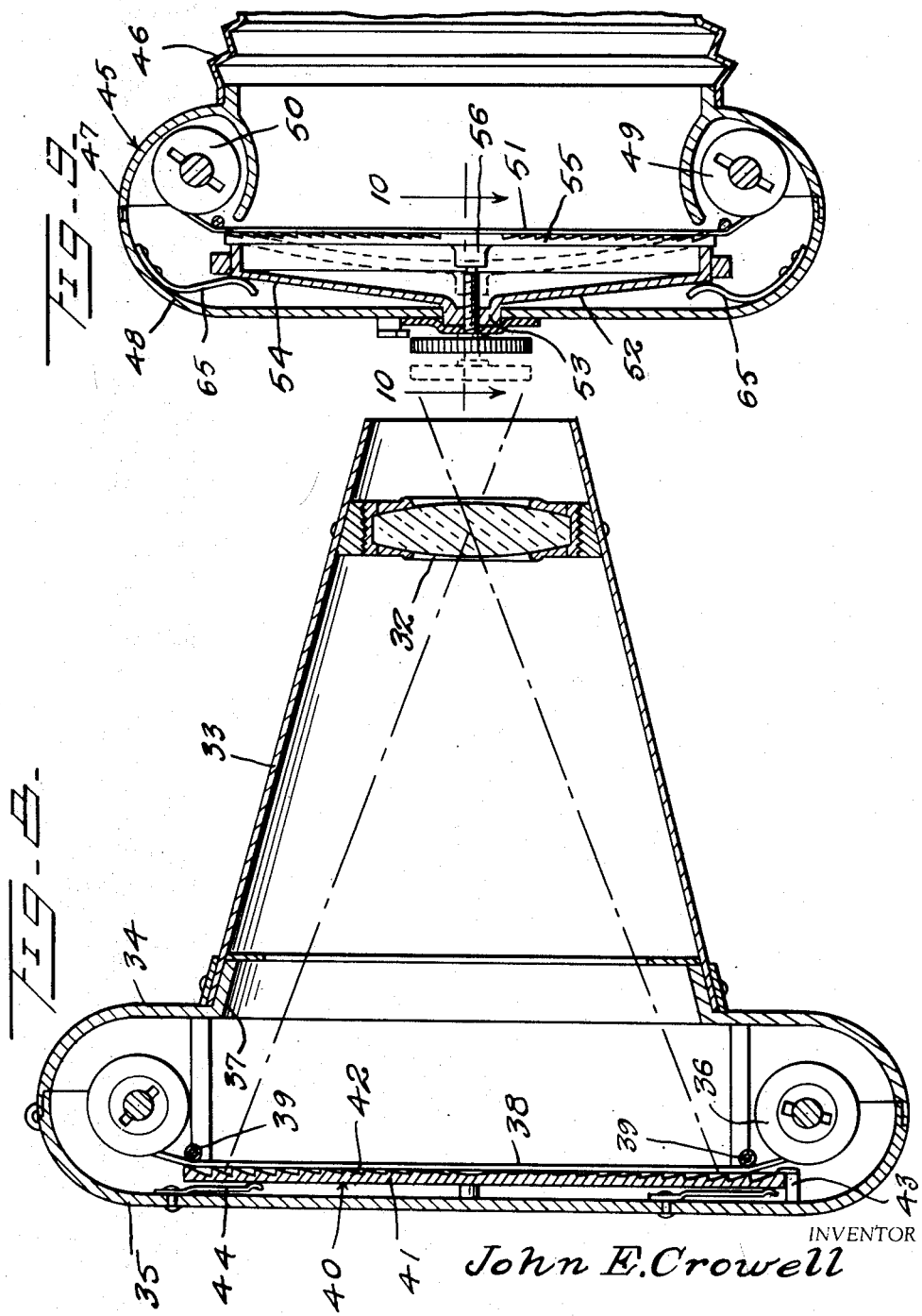

United States Patent Office 2,698,561
Patented Jan. 4, 1955

2,698,561

CAMERA WITH REFLECTIVE FILM BACKING PLATE

John E. Crowell, Matthews, N. C.

Application February 1, 1952, Serial No. 269,482

1 Claim. (Cl. 95—11)

This invention relates to cameras.

An object of this invention is to provide in a camera, a focused light reflector which is positioned behind the sensitized film for reflecting light rays passing through the film or plate so as to thereby produce a more sharply defined latent image.

Other objects of this invention are to provide a focused light reflector which can be used with the present construction of a camera so as to produce a more sharply defined image, and also to permit a faster exposure of a given film.

It will be understood that in conventional cameras the light rays passing through the lens strike the film or sensitized coating, and as the film with the sensitized coating is initially substantially transparent, the light rays pass through the film and are partially absorbed by the black or opaque surface which is behind the film. It is an object of this invention to provide in a camera, means whereby the light rays passing through the film will be reflected back to and through the film so as to thereby speed up the activation of the sensitized material and produce a better picture with the use of a slower speed lens or a smaller aperture. In the present invention the reflection of the light rays back through the film causes the light rays to pass through the film at the point of original entry so that the reflected rays will not result in a blurring of the outline of the image, but will result in producing a sharpness to the image outlines and also more depth to the field.

In a modified form of this invention the light reflector is made adjustable for use with an adjustable focus lens so that the reflector will be synchronized with the lens and in this manner the reflected light rays will be reflected back through the film or sensitized material at the point of entry when focused for varying distances.

With the above and other objects in view, my invention consists in the arrangement, combination and details of construction disclosed in the drawings and specification, and then more particularly pointed out in the appended claim.

In the drawings—

Figure 1 is a front elevation of a septum or film holder constructed according to an embodiment of this invention, Figure 2 is a sectional view taken on the line 2—2 of Figure 1 showing the septum with a cut film mounted therein, Figure 3 is an enlarged fragmentary sectional view taken on the line 3—3 of Figure 1, Figure 4 is an enlarged fragmentary sectional view of the central portion of the septum shown in Figure 1, Figure 5 is a fragmentary sectional view of the septum holder showing the projection of light rays from the lens, Figure 6 is a plan view partly broken away of a plate or film holder showing a modified form of this invention, Figure 7 is a sectional view taken on the line 7—7 of Figure 6, Figure 8 is a longitudinal section showing another modification of this invention, Figure 9 is a fragmentary sectional view showing a further modification of this invention, Figure 10 is a fragmentary sectional view taken on the line 10—10 of Figure 9, Figure 11 is a rear elevation of the reflector adjusting wheel shown in Figures 9 and 10, Figure 12 is a fragmentary sectional view showing a further modification of this invention.

Referring to the drawings and first to Figures 1 to 5 inclusive, the numeral 15 designates generally a cut film holder which is formed of a body 16 having inwardly bent guide forming members 17 about three marginal edges thereof, whereby a film 18 having a sensitized surface 19 on one face thereof may be removably mounted in the holder 15. In order to provide a means whereby the light rays which are projected from the lens to the film 18 onto the sensitized surface 19 may be reflected back through the film 18, I have provided angled reflecting facets or surfaces 20 which are formed on the inner side of the body 16.

These reflecting surfaces 20 are circular in plan extending outwardly from a central concave reflecting surface 21. The angle of reflection of the surfaces 20 is such that the light rays passing through the film or plate 18 and the sensitized surface 19 will be reflected back through the film or plate at the exact point of entrance on the forward side of the plate or film so that the sensitized material will be additionally activated through the direct and reflected light rays. The reflecting surfaces or facets 20 may be cut into the forward side of the body 16 or, as shown in Figure 12, the body 16a may have the facets or reflecting surfaces 20a pressed or stamped into the body 16a.

Referring now to Figures 6 and 7, there is disclosed a multiple plate or cut film holder 22 embodying a rectangular frame 23. The frame 23 has a pair of opaque slides 24 and 25 removably mounted therein so as to exclude light from a pair of films or plates 26 and 27. A pair of oppositely disposed reflecting members 28 and 29 similar to the reflecting member or body 16 are disposed within the frame 23 and have the facets or reflecting surfaces 30 and 31, respectively, confronting the inner sides of the plates or films 26 and 27.

Referring now to Figure 8, there is disclosed a longitudinal section of a roll film camera having a fixed focus lens 32 disposed in the forwardly tapering housing 33. The rear or large end of the housing 33 is secured to and extends from a box or body 34 having a removable back wall 35. The body 34 is adapted to hold a roll of film 36, which is extended across the opening in the body 34, indicated at 37. The film 38, which is disposed in the opening 34, passes behind a pair of guide rollers 39. The construction hereinbefore described is conventional and in order to provide a means whereby the light rays from the lens 32 may be reflected back through the film 38 at the point of entry of the light rays through the film 38, I have provided a reflector member 40 which is constructed similar to the reflector member or body 16, and is substituted in place of the usual pressure plate and also serves as such.

The reflector member 40 includes a flat pressure plate 41 having circular reflecting facets 42 on the forward side thereof confronting the rear side of the film 38. The reflector 40 is carried by the back wall or cover 35, being mounted on headed supporting members 43 carried by the wall 35. A pair of inwardly biased springs 44 fixed to the inner side of the wall 35 constantly press the reflector 40 forwardly into substantially parallel relation with respect to the film 38 and resiliently hold the reflector 40 in the area defined by the supporting members 43.

Referring now to Figures 9, 10 and 11 there is disclosed another modification of this invention embodying a camera 45 having adjustable focus lens with a bellows 46 extending from a box 47. The box 47 includes a removable back wall 48. A roll film 49 is disposed within the box 47, and the film is extended from the roll 49 to a winding reel 50 so as to provide a span of film 51 in a position to be contacted by the light rays from the lens. The back wall 48 has movably mounted therein a relatively rigid plate 52 formed with a central boss 53, which extends loosely through the back wall 48. The plate 52 is formed with forwardly extending marginal flanges 54, and a flexible reflector plate 55, similar to the reflector plate 16, is disposed in contacting relation with the inner edges of the flanges 54. The plate 52 is constantly urged inwardly to maintain the reflector 55 in substantial contact with the rear of film 51 by means of springs 65 carried by wall 48.

The reflector 55 is formed with a central boss 56 having a ball socket 57 within which a ball 58 rotatably engages.

The ball 58 is carried by the inner end of a reflector adjusting screw 59, which is threaded through the boss 53. A knob or wheel 60 is secured to the outer or rear end of the screw 59 and, as shown in Figure 11, the wheel 60 is formed with graduations 61. A fixed pointer 62 is carried by the rear wall 48, being disposed with the pointed end thereof adjacent the marginal portion of the wheel 60. The wheel 60 is adapted to be adjusted in conformity with the adjustment of the lens so that the concavity of reflector 55 (see Figure 9) will be synchronised as to the focal length of its reflecting surfaces with the adjusted lens. In this manner, as the lens is adjusted, the reflector will be adjusted correspondingly in order that the reflected light rays will at all times focus at and be reflected back through the film 51 at the point of entry of the light rays in the forward side of the film.

In the use and operation of this invention, where a cut film or plate holder is used similar to the structure shown in Figures 1 and 2 or in Figures 6 and 7, the reflecting surfaces are disposed on the inner or rear side of the film or plate. When the light rays strike the sensitized surface of the film or plate, these light rays will pass through the film or plate, which at this time is substantially transparent. The reflection of the light rays back through the film at the point of entry of the light rays or point of contact of such rays with the sensitized surface will have the effect of increasing the activation of the sensitized material on the film or plate so that the image, which at this time is latent, will be produced with sharper outlines and at the same time will have a greater depth. This increase in the sharpness of the image outlines is produced by the reflected focused light rays, and the improved result will be accomplished with faster exposure speeds, made possible by the use of this invention. The increase of the sharpness of the image also is accomplished by reducing the light opening. This reflection of the focused light rays will permit the use of higher speed shutters with color film, and the image outlines on the color film will be sharp; while at the same time the material forming the color will be activated to an increased extent, and the various colors will be produced in greater brilliance and with a greater depth of field.

I do not mean to confine myself to the exact details of construction herein disclosed, but claim all variations falling within the purview of the appended claim.

What I claim is:

In combination, a camera including a housing, a bellows extending from said housing, a lens carried by said bellows, a sensitized film in said housing, a flexible reflector plate in said housing confronting the rear side of said film, said reflector being formed with grooved concentric circular facets, said facets having inclined reflecting surfaces on their inner sides and means contacting the center of said plate for adjusting the concavity of said plate relative to said film whereby to vary the focal length of the reflecting surfaces of said concentric rings to reflect light rays back through said film at the point of direct contact of the rays with the film in any adjustment of the lens.

References Cited in the file of this patent

UNITED STATES PATENTS

| | | |
|---|---|---|
| 1,173,083 | Banks | Feb. 22, 1916 |
| 1,344,896 | Jobke | June 29, 1920 |
| 1,535,985 | Clark | Apr. 28, 1925 |